United States Patent [19]

Omi et al.

[11] 4,337,021
[45] Jun. 29, 1982

[54] APPARATUS FOR MOLDING FIXED-DIMENSIONAL SPHERICAL BODIES FROM A SEMISOLID STICK

[75] Inventors: Yasuo Omi, Yamato; Takanori Wada, Machida; Hitoshi Sano, Sayama; Shigekatsu Sato, Hidaka; Kazuo Ido, Hino; Kozo Taneda, Kodaira; Junichi Naka, Tokyo, all of Japan

[73] Assignee: Snow Brand Milk Products Co., Ltd., Sapporo, Japan

[21] Appl. No.: 138,813

[22] Filed: Apr. 9, 1980

[30] Foreign Application Priority Data

Jun. 26, 1979 [JP] Japan ............................. 54-87305[U]
Jun. 26, 1979 [JP] Japan ............................. 54-87306[U]

[51] Int. Cl.³ .............................................. B28B 17/00
[52] U.S. Cl. .................................... 425/142; 264/40.2
[58] Field of Search ........................ 425/142; 264/40.2

[56] References Cited

U.S. PATENT DOCUMENTS 3,738,787 6/1973 Martelli et al. ...................... 425/142
3,846,529 11/1974 Poteet ................................. 264/142
3,912,434 10/1975 Nagahara et al. ................... 425/142

Primary Examiner—James R. Hall
Attorney, Agent, or Firm—Blanchard, Flynn, Thiel, Boutell & Tanis

[57] ABSTRACT

An apparatus for molding spherical bodies from a semisolid stick wherein said semisolid stick is extruded through a nozzle; a sensing unit disposed in front of said nozzle detects it to thereby send a signal to a cutter; said cutter, upon receiving said signal, is actuated to cut said stick in fixed lengths; the sticks thus cut are received in a rotatable mold; and said rotatable mold allows said cut sticks to travel along the inside of a molding passage which comprises the rotatable mold and a fixed mold disposed opposite thereto.

6 Claims, 9 Drawing Figures

— 4,337,021 —

APPARATUS FOR MOLDING FIXED-DIMENSIONAL SPHERICAL BODIES FROM A SEMISOLID STICK

FIELD OF THE INVENTION

The present invention relates to an apparatus for cutting a semisolid stick extruded through a nozzle of an extruder in fixed lengths and then molding the thus cut sticks into spherical bodies, said semisolid stick being made of, for instance, cheese whose physical properties are subject to thermal changes or the like.

BACKGROUND OF THE INVENTION

Conventional commercially available process cheeses have hitherto been prepared by the process as illustrated in FIG. 1 which comprises preparing a raw material by mixing cheese with a secondary material and the like; heat emulsifying the resulting raw material into a molten state; continuously passing said molten material through a cooling cylinder to semi-solidify said material; extruding a semisolid stick of said material through a nozzle; cutting said stick in fixed lengths by means of a rotary cutter or reciprocating cutter disposed in front of said nozzle and arranged to operate at fixed intervals; and thereafter packing a product after it is made into an intended shape by means of a suitable machine or packing a product as cut by said cutter.

However, the above mentioned conventional apparatus is defective in that since the viscosity of cheese is liable to conspicuously increase as its temperature is reduced and the cheese, is subject to structural non-uniformity when the thermal conductivity is deteriorated and so forth, it is impossible to maintain the extruding speed constant and consequently it is difficult to maintain the cutting lengths constant.

Further, said conventional apparatus is defective in that since the cut sticks can not be made into spherical bodies without re-applying the former to another making machine as stated above, it is impossible to perform a continuous operation extending from extrusion molding to formation of spherical bodies, thereby deteriorating the manufacturing capacity.

Still further, up to now there has not been developed a molding apparatus capable of producing the spherical bodies as mentioned above which are free from distortion, automatically and continuously.

SUMMARY OF THE INVENTION

Accordingly, it is an object of the present invention to provide a molding apparatus capable of eliminating the drawbacks inherent in conventional molding apparatuses as well as cutting a semisolid stick of a fixed diameter in fixed lengths and successively making the thus cut sticks into spherical bodies.

It is another object of the present invention to provide a molding apparatus including a cutting means capable of cutting a semisolid stick of a fixed diameter, which has been extruded through a nozzle, in fixed lengths regardless of the extruding speed.

It is still another object of the present invention to provide a molding apparatus including a molding means capable of obtaining distortion-free, uniform diameter, spherical bodies from a semisolid stick which is fixed in diameter and length.

In order to achieve the above objects, the apparatus according to the present invention is characterized by the construction that a sensing unit detects the fore end of a semisolid stick extruded from a nozzle, said sensing unit being spaced in front of said nozzle, to thereby send a signal to a cutter, said cutter is thus actuated to cut said stick, the thus cut sticks are received in a main forming groove which is partly circular in cross section and is provided on the outer periphery of a rotable mold, and said sticks are allowed to travel along the inside of a forming passage defined by the cooperation between said main forming groove and a partly circular sub forming groove, whereby said sticks are made into spherical bodies.

Furthermore, the apparatus according to the present invention is characterized in that it is comparatively small-sized because its sensing unit includes a proximity switch and it is favorably applicable to stick-like foods such as cheese and the like for sanitary reasons, too.

Still further, the apparatus according to the present invention is characterized in that the main forming groove of the rotatable mold is deeper than the sub forming groove of the fixed mold and additionally the sub forming groove becomes deeper and deeper from its inlet to its outlet, whereby there can be obtained spherical bodies each of which has a distortion-free, uniform diameter and the outer periphery of which is free from the formation of a lug or the like.

The present invention, as is evident from the aforegoing, is applicable to any semisolid bodies having characteristics similar to cheeses. However, as an exemplary embodiment of the present invention, there can be enumerated an apparatus for molding a cheese ball. In view of this, reference will be made mainly to said apparatus hereinafter.

DETAILED DESCRIPTION OF PREFERRED EMBODIMENT

Figure 1:
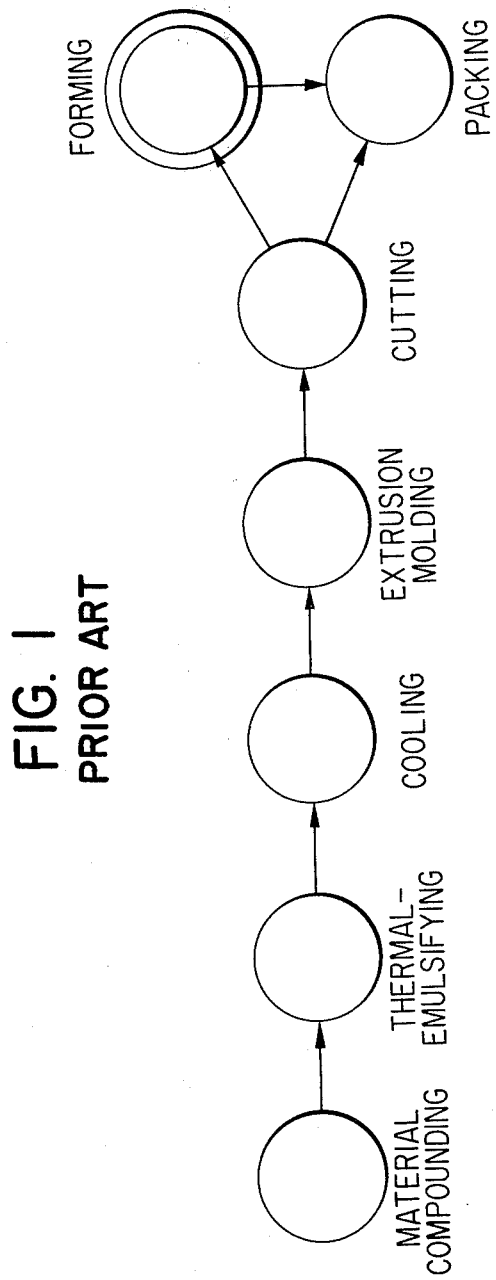
FIG. 1 is a view illustrating a prior art process for molding a cheese ball which is one kind of spherical body made by using the apparatus according to the present invention.

Numeral 1 denotes a nozzle which is attached to a frame 2 by means of a supporting plate 3, the base end (right end in FIG. 3) of said nozzle being connected to an extruder.

A supporting plate 5 is located at an appropriate spacing in front of the nozzle 1 and its position is set with a set screw 4. To this supporting plate 5 there is attached, opposite to the nozzle 1, an electrode 9 of a touch switch 6, namely, a kind of proximity switch. The outer periphery of the case 10 for this electrode 9 is threaded. Said case 10 is thus screwed in a threaded hole in the supporting plate 5. Further, a handle 7 is mounted on the case 10 with a spring 8 being interposed between the handle and the supporting plate 5. The case 10 is turned by means of the handle 7, whereby the relative position of the electrode 9 to the nozzle 1 can be controlled.

Figure 6:
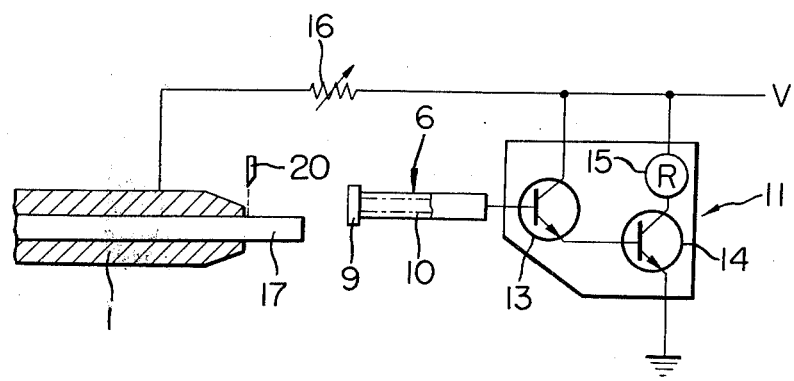
FIG. 6 is an elevational view of the cutting portion of the molding apparatus according to the present invention.

One embodiment of the touch switch 6 is illustrated in FIG. 6, wherein an element such as a surge killer, varister or the like is employed as the electrode 9 and this electrode is connected to the base of a first transistor 13 in a Darlinton circuit 11 within which first and second transistors 13 and 14 and a relay 15 are disposed. And, this circuit 12 is connected to a circuit wherein the nozzle 1 is connected with a weak power source V, for instance, of 3 V or so, and a resistance 16 is interposed therebetween.

Over the nozzle 1, a cutter 20 is mounted on a shaft 19 of a motor 18 supported on the frame in parallel with the nozzle. And, this cutter 20, when allowed to move downwards, is arranged to travel across and in front of the nozzle 1 and substantially perpendicular to the lengthwise direction of the nozzle.

Figure 5:
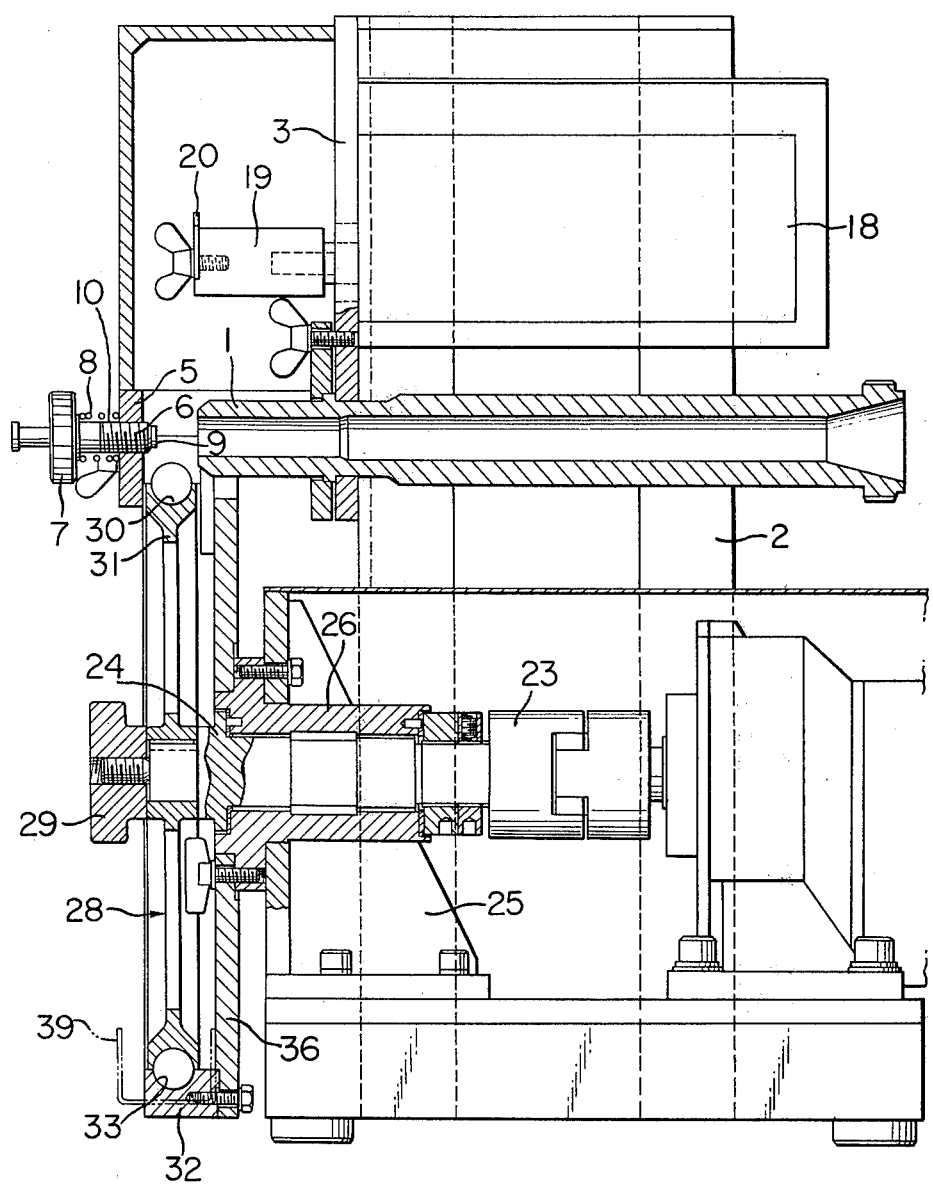
FIG. 5 is a vertical section of a part of FIG. 4 viewed from the right side.

Referring to FIG. 5, under the nozzle 1, a shaft 24 is joined, through a coupling 23, with a shaft of a motor 22 (FIG. 3) supported on the frame substantially in parallel with the nozzle 1. This shaft 24 is supported on a bearing 26 which is mounted on a bracket 25 secured to the frame. And, a rotatable mold 28 is attached to the fore end of the shaft 24. Numeral 29 denotes a fastening nut therefor.

The rotatable mold 28, as is clearly seen especially from FIG. 5, includes a disc 31 having at its outer periphery a circular, main, forming groove 30 which groove is partially circular in cross section so that said groove defines the radially inner portion of a torus. This disc 31 is disposed so that the groove 30 passes through the lower part of the space defined between the outlet of the nozzle 1 and the electrode 9 of the switch 6.

A semicircular fixed mold 32 partially encircles the disc 31. The fixed mold 32 has a curved inner peripheral surface extending along the outer peripheral surface of the fore half (left side in FIG. 2 and FIG. 4) of the disc 31 in the direction the disc moves after it has passed the nozzle 1. In the inner periphery of said fixed mold 32 there is formed a semicircular sub forming groove 33 which defines the outer portion of a segment of a torus. The sub forming groove 33 cooperates with the main forming groove 30 to define a forming hole 34 which is substantially circular in cross section and is elongated to form a portion of a torus. The fixed mold 32 is secured to the frame by means of a bracket 36 mounted on the bearing 26. This bracket 36 is provided with a stopper 37 (FIG. 4) in the vicinity of the lower part of the nozzle 1.

Figure 7:
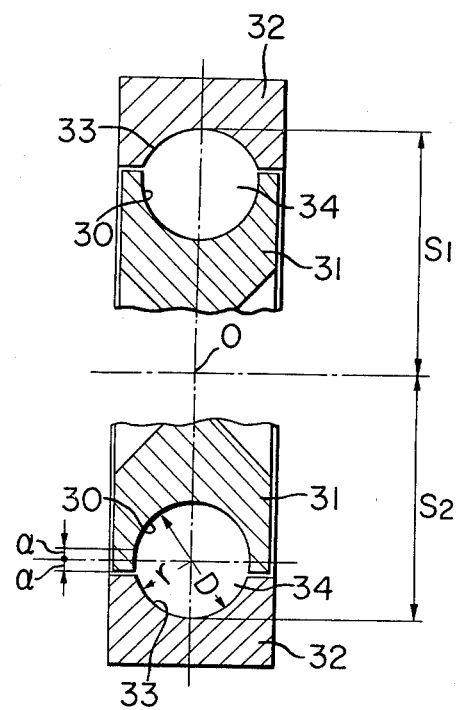
FIG. 7 is a partially enlarged sectional view illustrating the relation between the rotatable mold and the fixed mold used for making spherical bodies in the molding apparatus according to the present invention.

It is to be understood that when comparing the groove 30 with the groove 33, as is apparent from FIG. 7, the former is deeper than the latter. When calculating the depth at the outlet thereof, in case the radius of the forming hole 34 is $\gamma$, the depth of the groove 30 is $\gamma+\alpha$, while the depth of the groove 33 is $\gamma-\alpha$.

Next, referring to the groove 33, it is shallowest at the inlet and becomes deeper and deeper towards the outlet. In other words, in case the centers of the rotatable mold 28 and groove 33 are located at point 0 (FIG. 7) and the distances from said centers to the outer peripheries of the groove 33 at the inlet and outlet are S1 and S2, the above mentioned relation may be expressed as being $S2 > S1$.

Figure 2:
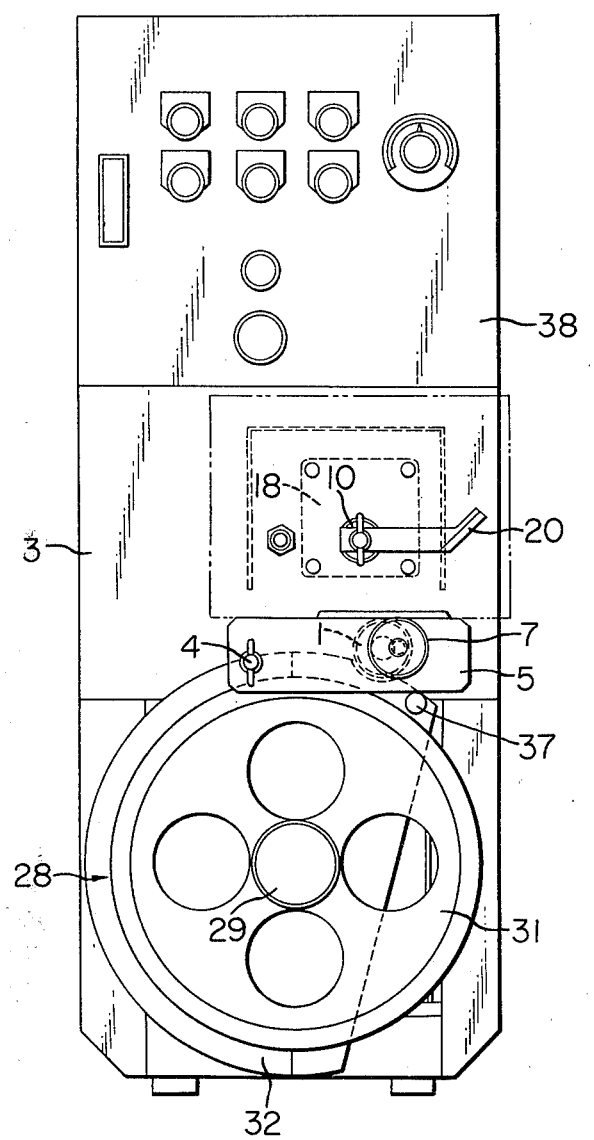
FIG. 2 is an elevational view of the molding apparatus according to the present invention.
Figure 3:
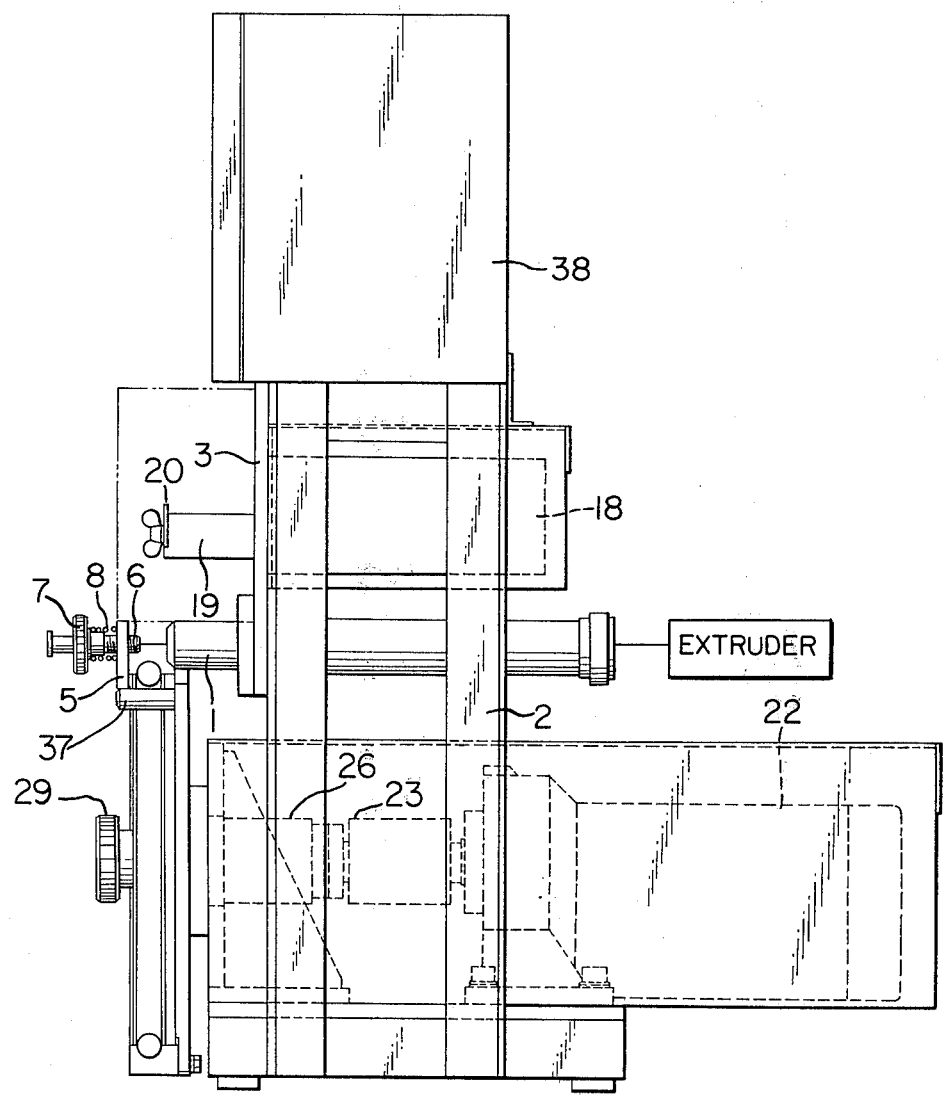
FIG. 3 is a right side view of FIG. 1.
Figure 4:
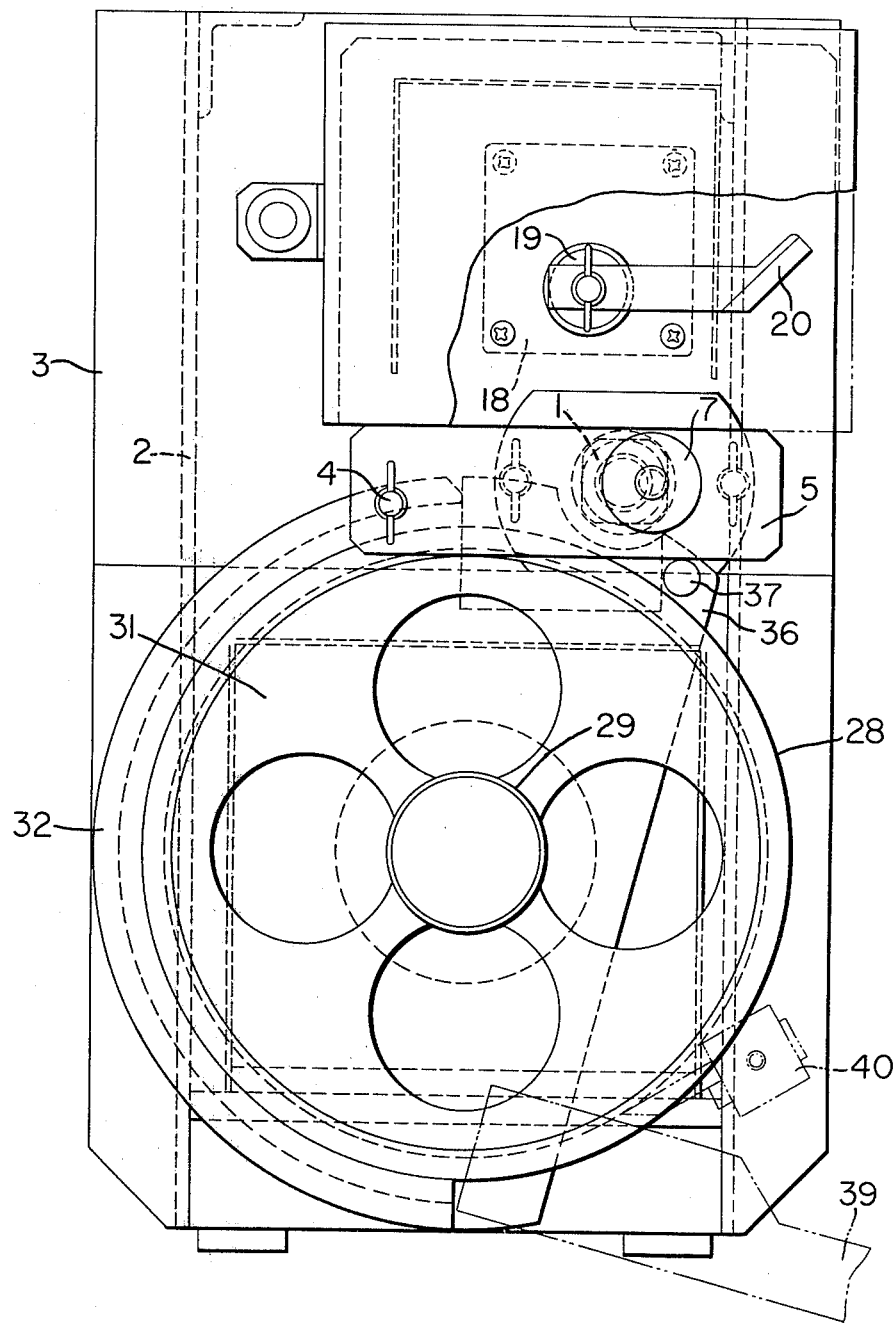
FIG. 4 is a partially cutaway enlarged view of a part of FIG. 2.

In FIG. 2 and FIG. 3, furthermore, numeral 38 denotes a control box, and in FIG. 4 and FIG. 5 numeral 39 denotes a chute for discharging moldings, and numeral 40 denotes a scraper for raking out moldings.

Next, reference will be made to the operation of the above explained apparatus. In operation, for instance in FIG. 6, when the cheese 17 extruded from the nozzle 1 contacts the electrode 9, an electric current is turned on between the nozzle 1 and electrode 9 through the cheese 17 and consequently a weak electric current is applied to the first transistor 13. This electric current is amplified by the second transistor 14 to thereby actuate the relay 15. The actuation of this relay 15 drives the motor 18 and in turn the cutter 20 is turned, thereby cutting the cheese 17 in front of the nozzle 1. In this case, the relative positional relation between the nozzle 1 and electrode 9 has been controlled correctly by turning the casing 10 relative to the supporting plate 5. And, since the electric source V for the touch switch 6 is low in voltage, as described above, there is no possibility that an electric spark will be emitted when the electrode 9 contacts with the cheese 17. Although the emission of electric sparks, if any, ordinarily exerts an unfavorable influence upon the cheese 17, the apparatus according to the present invention, which has been constructed as mentioned above, can avoid such an unfavorable effect.

As can be seen from the foregoing, the cheese 17 can always be cut in fixed lengths, regardless of the extruding speed, by setting the relative positional relation between the nozzle 1 and electrode 9 properly.

The thus cut cheese pieces are allowed to fall down towards the groove 33 formed in the disc 31 constituting the rotatable mold 28. At that time, the stopper 37 (FIG. 4) ensures that said cheese pieces are received in the groove 33 accurately without deviating outwards from the normal course. These cheese pieces move toward the upper inlet of the fixed mold 32 as the disc 31 rotates, are guided in the forming hole 34 defined by the grooves 30 and 33, respectively, of the molds 28 and 32, and then are discharged from the lower outlet into the chute 39. These cheese pieces are molded into spherical bodies by both of the grooves 30 and 33 as they pass through the elongated hole 34 that extends from the inlet to the outlet adjacent the chute.

In this connection, it is to be understood that the reason why the groove 30 is made deeper than the groove 33 is as mentioned below. If both grooves 30 and 33 are arranged to have the same depth there will be brought about the drawbacks as mentioned hereinafter: First, the cheese pieces are affected at the outlet adjacent the chute by the shearing force generated due to the increased contact resistance in the groove 33 and the interrelation between the rotation of the groove 30 and the accompanying rotation of cheese pieces per se with the result being that said cheese pieces are molded into distorted spherical bodies, and secondly as the result of the directin of rotation of cheese pieces in the forming hole 34 becoming constant, said cheese pieces are liable to protrude out of the gap defined between the adjoining surfaces of both molds 28 and 32, whereby there are produced cheeses with undesirable lugs. The apparatus according to the present invention has successfully overcome such drawbacks by making the depths of both grooves 30 and 33 in above mentioned dimensions. Concerning the difference in depth between both grooves, it is observed that a satisfactory result can be obtained when meeting the following conditions in FIG. 7:

(α1−α2)/D=0.1 mm or less, preferably about 0.05 mm wherein, when D is a diameter of, for instance, 18 mm, α is about 0.75 mm; and α1 and α2 denote the maximum and minimum of α respectively.

Next, since the groove 33 is deeper at the outlet side than at the inlet side, in other words since S2>S1 in FIG. 7, the cheese pieces guided in this groove 33 are subjected to stress adjacent the inlet end of the groove and then are released from it gradually towards the outlet end thereof. Consequently, the rotation of cheese pieces in the forming hole 34 becomes complicated, whereby it makes a contribution in preventing the occurrence of lugs and further the cheese pieces can be discharged smoothly without being subject to deformation because the friction existing at the outlet end of the groove 33 is little.

Figure 8:
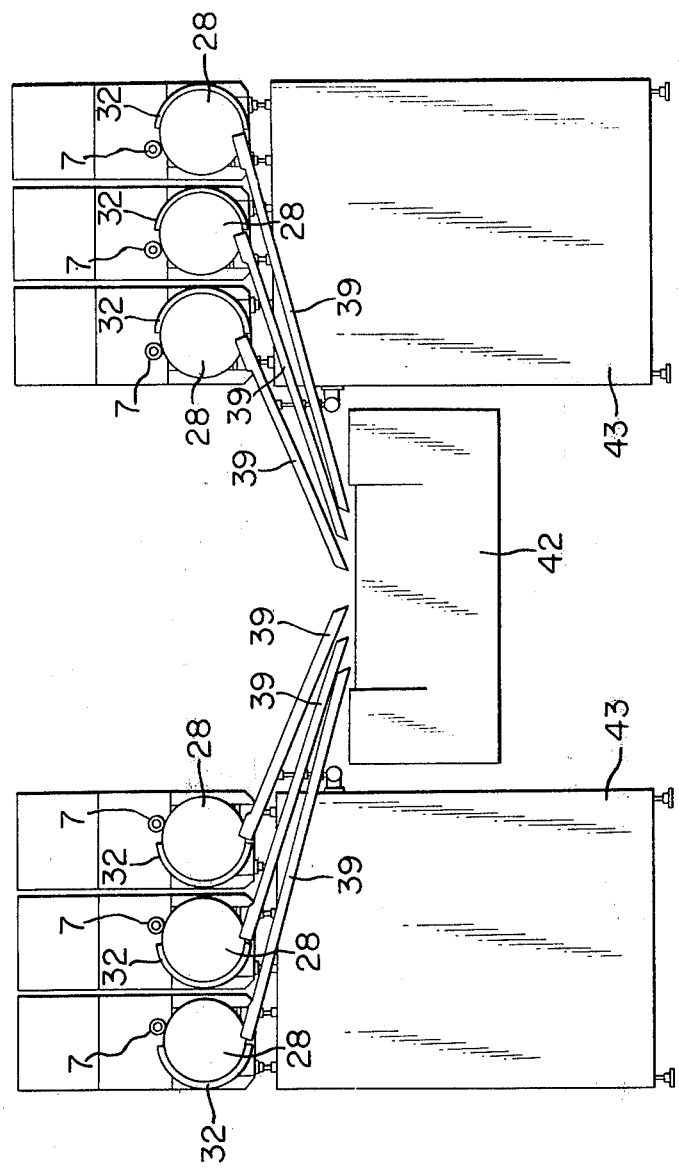
FIG. 8 is an elevational view illustrating the state wherein plural apparatuses according to the present invention have been disposed respectively on the left and right sides.
Figure 9:
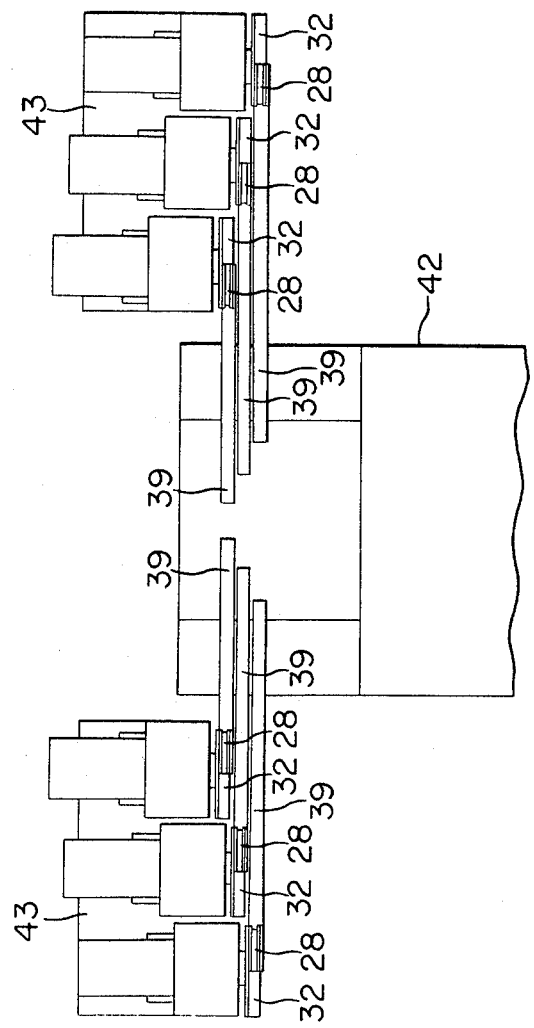
FIG. 9 is a top plan view of the state illustrated in FIG. 8.

FIG. 8 and FIG. 9 illustrate embodiments of apparatuses according to the present invention wherein three molding apparatuses devised as described above are disposed in a line respectively on left and right sides and a product receiving box 42 is disposed in the center for receiving therein molded cheese balls. Numeral 43 denotes therein a supporting base for the molding apparatus.

Although particular preferred embodiments of the invention have been disclosed hereinabove for purposes of illustration, it will be understood that variations or modifications thereof which lie within the scope of the invention as defined by the appended claims are fully contemplated.

What is claimed is:

1. An apparatus for molding spherical bodies, comprising:
an extruder having a nozzle for extruding a semisolid stick of extrudable material;
a sensing unit positioned in front of said nozzle for sensing the front end of the semisolid stick extruded from said nozzle and sending a signal when the semisolid stick projects a predetermined distance frontwardly from said nozzle;
a cutter operable in response to the signal for cutting off a piece of predetermined length of the portion of the semisolid stick that projects frontwardly from said nozzle;
a first, rotatable, circular mold having a first, radially outwardly facing, annular groove in its periphery, said first annular groove being partially circular in cross section so that said first annular groove has the shape of the radially inner portion of a torus, said first, rotatable, circular mold being disposed so that the pieces cut off from the semisolid stick are received in said first annular groove and the pieces move with said first annular groove as said first, rotatable, circular mold rotates;
a second, stationary, substantially semi-circular mold located outside of and adjacent to said first, rotatable, circular mold and extending circumferentially thereof and defining therewith a substantially semi-circular shaping zone, said semicircular shaping zone having an inlet at the circumferential end thereof located close to said nozzle and an outlet at the opposite circumferential end thereof, said second, stationary mold having a second, radially inwardly facing, substantially semi-circular groove, said second groove being substantially partially circular in cross section so that said second groove has the shape of the radially outer portion of a substantially semi-circular segment of the torus, said first and second grooves mating in said shaping zone to define an elongated mold cavity having the shape of a substantially semi-circular segment of the torus, the torus having a substantially circular cross section so that the pieces are formed into spherical bodies as they move through said shaping zone as said first, rotatable, circular mold rotates relative to said second, stationary mold;
and means for discharging said spherical bodies from the outlet of said shaping zone.

2. An apparatus according to claim 1 wherein said sensing unit includes a proximity switch.

3. An apparatus according to claim 1, including a motor having a rotatable shaft, said motor being actuated by a signal from said sensing unit, said cutter being mounted on said shaft.

4. An apparatus according to claim 1 wherein said first, rotatable, circular mold comprises a disc whose periphery is movable through the space defined between said nozzle and said sensing unit so that said first annular groove passes through the lower part of said space.

5. An apparatus according to claim 1 wherein the depth of said first groove is greater than the depth of said second groove.

6. An apparatus according to claim 1 or claim 5 wherein said second groove progressively increases in depth from the inlet of said shaping zone toward the outlet of said shaping zone.

* * * * *